(12) United States Patent
Franklin et al.

(10) Patent No.: US 8,934,228 B2
(45) Date of Patent: Jan. 13, 2015

(54) DISPLAY-BASED SPEAKER STRUCTURES FOR ELECTRONIC DEVICES

(75) Inventors: Jeremy C. Franklin, San Francisco, CA (US); Fletcher R. Rothkopf, Los Altos, CA (US); Scott A. Myers, San Francisco, CA (US); Stephen Brian Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 137 days.

(21) Appl. No.: 13/422,724

(22) Filed: Mar. 16, 2012

(65) Prior Publication Data
US 2012/0243719 A1    Sep. 27, 2012

Related U.S. Application Data

(63) Continuation-in-part of application No. 13/171,295, filed on Jun. 28, 2011.

(60) Provisional application No. 61/454,894, filed on Mar. 21, 2011.

(51) Int. Cl.
*G06F 1/16* (2006.01)
*H05K 5/00* (2006.01)
(Continued)

(52) U.S. Cl.
CPC ............... *H04R 1/02* (2013.01); *H04R 2499/15* (2013.01); *H04R 1/028* (2013.01); *H04R 9/06* (2013.01); *G06F 1/1652* (2013.01)
USPC ................................. 361/679.26; 361/679.55

(58) Field of Classification Search
CPC ........ H04R 9/06; H04R 1/02; H04R 2499/15; H04R 1/025; G06F 1/1652
See application file for complete search history.

(56) References Cited

U.S. PATENT DOCUMENTS 7,151,837 B2 * 12/2006 Bank et al. .................... 381/190
7,174,025 B2 *  2/2007 Azima et al. .................. 381/152
(Continued)

FOREIGN PATENT DOCUMENTS

EP       0929027        7/1999
EP       1 635 313      3/2006
(Continued)

OTHER PUBLICATIONS

Raff et al., U.S. Appl. 13/452,061, filed Apr. 20, 2012.
(Continued)

*Primary Examiner* — Adrian S Wilson
(74) *Attorney, Agent, or Firm* — Treyz Law Group; Kendall P. Woodruff

(57) ABSTRACT

Electronic devices that contain flexible displays and one or more display-based speaker structures may be provided. The speaker structures may be positioned under the flexible display. Portions of the flexible display may be used as speaker membranes for the speaker structures. The speaker structures may be driven by transducers that convert electrical audio signal input into sound. Piezoelectric transducers or transducers formed from coils and magnets may be used to drive the speaker structures. Speaker membranes may be formed from active display areas of the flexible display. Some, all, or substantially all of the flexible display may be used as a speaker membrane for one or more display-based speaker structures. An optional cover layer may be provided with speaker openings so that sound may pass from the display-based speaker structures to the exterior of the device.

22 Claims, 14 Drawing Sheets

(51) Int. Cl.
*H05K 7/00* (2006.01)
*H04R 1/02* (2006.01)
*H04R 9/06* (2006.01)

(56) References Cited

U.S. PATENT DOCUMENTS

| | | | |
|---|---|---|---|
| 7,382,890 B2 | 6/2008 | Saiki et al. | |
| 7,565,949 B2 * | 7/2009 | Tojo | 181/199 |
| 7,680,293 B2 * | 3/2010 | Lin et al. | 381/349 |
| 7,798,284 B2 * | 9/2010 | Wada | 181/199 |
| 8,068,635 B2 | 11/2011 | Carlson et al. | |
| 8,189,851 B2 | 5/2012 | Booth et al. | |
| 8,233,646 B2 * | 7/2012 | Lutz et al. | 381/190 |
| 2002/0001187 A1 * | 1/2002 | Murofushi | 362/31 |
| 2003/0227441 A1 | 12/2003 | Hioki et al. | |
| 2005/0025330 A1 | 2/2005 | Saiki et al. | |
| 2005/0140646 A1 | 6/2005 | Nozawa | |
| 2005/0226455 A1 | 10/2005 | Aubauer et al. | |
| 2006/0238494 A1 | 10/2006 | Narayanaswami | |
| 2007/0202917 A1 | 8/2007 | Phelps et al. | |
| 2007/0242033 A1 | 10/2007 | Cradick et al. | |
| 2007/0247422 A1 | 10/2007 | Vertegaal et al. | |
| 2007/0258604 A1 | 11/2007 | Bosnecker | |
| 2008/0305838 A1 | 12/2008 | Joo | |
| 2009/0097691 A1 | 4/2009 | Eaton | |
| 2009/0219247 A1 | 9/2009 | Watanabe | |
| 2010/0073593 A1 * | 3/2010 | Sasaki et al. | 349/58 |
| 2010/0164888 A1 * | 7/2010 | Okumura et al. | 345/173 |
| 2010/0188422 A1 | 7/2010 | Shingai et al. | |
| 2011/0037734 A1 | 2/2011 | Pance et al. | |
| 2011/0074720 A1 | 3/2011 | Ozaki | |
| 2012/0111479 A1 | 5/2012 | Sung et al. | |
| 2012/0211148 A1 | 8/2012 | Sung et al. | |
| 2013/0279088 A1 * | 10/2013 | Raff et al. | 361/679.01 |

FOREIGN PATENT DOCUMENTS

| | | |
|---|---|---|
| EP | 1827057 | 8/2007 |
| EP | 1 970 886 | 9/2008 |
| EP | 2 192 750 | 6/2010 |
| EP | 2202624 | 6/2010 |
| JP | Hei 6-66969 | 3/1994 |
| JP | 2000-293117 | 10/2000 |
| JP | 20061061194 | 3/2001 |
| JP | 2001-154592 | 6/2001 |
| JP | 2001189978 | 7/2001 |
| JP | 2002232992 | 8/2002 |
| JP | 2003125315 | 4/2003 |
| JP | 2003125315 A | 4/2003 |
| JP | 2003179988 | 6/2003 |
| JP | 2003-211087 | 7/2003 |
| JP | 2003211087 A | 7/2003 |
| JP | 2003-208548 | 10/2003 |
| JP | 2003280546 | 10/2003 |
| JP | 2004173264 | 6/2004 |
| JP | 2005-091873 | 4/2005 |
| JP | 2005110216 | 4/2005 |
| JP | 2007-41985 | 2/2007 |
| JP | 2007-272107 | 10/2007 |
| JP | 2008-234549 | 10/2008 |
| JP | 2008283350 | 11/2008 |
| JP | 2008283350 A | 11/2008 |
| JP | 2010-008480 | 1/2010 |
| JP | 2010-157060 | 7/2010 |
| JP | 2010-191246 | 9/2010 |
| JP | 2010-152888 | 10/2010 |
| KR | 10-2003-0017628 | 3/2003 |
| KR | 10-2005-0013578 | 2/2005 |
| WO | 0174114 | 10/2001 |
| WO | 02095342 | 11/2002 |
| WO | 2009-050812 | 4/2009 |

OTHER PUBLICATIONS

Sugimoto et al., "Loudspeakers for flexible displays," Acoust. Sci. & Tech., Japan, Jan. 12, 2010, vol. 30, 2, (pp. 151-153).

* cited by examiner

DISPLAY-BASED SPEAKER STRUCTURES FOR ELECTRONIC DEVICES

This application is a continuation-in-part of patent application Ser. No. 13/171,295, filed Jun. 28, 2011, which claims the benefit of provisional patent application No. 61/454,894, filed Mar. 21, 2011, both of which are hereby incorporated by reference herein in their entireties. This application claims the benefit of and claims priority to patent application Ser. No. 13/171,295, filed Jun. 28, 2011, and to provisional patent application No. 61/454,894, filed Mar. 21, 2011.

BACKGROUND

This relates generally to electronic devices, and more particularly, to display-based speaker structures for electronic devices.

Electronic devices such as portable computers and cellular telephones are often provided with displays made from display structures. For example, a liquid crystal display (LCD) may be formed from a stack of display structures such as a thin-film transistor layer with display pixels for providing visual feedback to a user, a color filter layer for providing the display pixels with color, a touch screen panel for gathering touch input from a user, and a cover glass layer for protecting the display and internal components.

Electronic devices may also have input-output components such as speakers, buttons, microphones, and other components. There is often very little real estate available for mounting these input-output components. For example, input-output components are often mounted under an inactive portion of a display or within the sidewalls of an electronic device housing.

The size and number of input-output components such as speakers may be limited by the amount of space available in these locations. For example, a conventional device may have a single speaker mounted under an inactive portion of a display. The size and quality of such a speaker may be limited by a lack of space in the inactive portion of the display. Additionally, mounting a speaker in the inactive portion of a display may add undesirable width to the inactive portion of the display.

It would therefore be desirable to be able to provide improved arrangements for forming components such as speakers in electronic devices with displays.

SUMMARY

Electronic devices with flexible displays may be provided. The flexible displays may include one or more flexible layers. A display cover such as a cover glass layer may be mounted over a flexible display.

The flexible display may be an organic light-emitting diode display having a flexible substrate formed from one or more sheets of polymer. The flexible display may include a touch sensor layer having an array of capacitive touch sensor electrodes.

There may be one or more display-based speaker structures in the electronic device. The display-based speaker structures may be mounted under the flexible display. Portions of the flexible display may be used as speaker membranes for the display-based speaker structures.

The flexible display may have an active area that is configured to display images to a user. Speaker membranes may be formed from the active portion of the flexible display. The display-based speaker structures may be driven by transducers that receive an electrical audio signal input from circuitry in the electronic device. Piezoelectric transducers or transducers formed from coils and magnets may be used to drive the display-based speaker structures.

A stiffening structure may be used to stiffen a portion of a flexible display that is used as a speaker membrane. The stiffening structure may be formed from a layer of foam interposed between sheets of stiffening material. The stiffening structure may form a stiff and lightweight support structure that allows the speaker membrane to respond accurately to the transducer.

A suspension structure may be used to attach a display-based speaker structure to surrounding housing structures. The suspension structure may form a pliant interface between the speaker structure and the surrounding housing structures. The suspension structure may allow the speaker structure to vibrate during speaker operation while inhibiting lateral motion of the speaker structure.

Speaker structures may be configured to achieve a desired frequency response. The electronic device housing in which a speaker structure is mounted may be provided with an acoustic port to tune speaker frequency response. The type of transducer that is used in a speaker may be selected to tune speaker frequency response. The size and placement of internal device components that affect speaker volume and speaker mass may also be selected to tune speaker frequency response.

An electronic device may be provided with an array of display-based speaker structures. The speaker membrane for each speaker structure may be stiffened with an associated stiffening structure. Each stiffened speaker membrane may be surrounded by a ring of flexible display that is configured to absorb lateral vibrations and thus prevent interference between neighboring speakers.

Further features of the invention, its nature and various advantages will be more apparent from the accompanying drawings and the following detailed description of the preferred embodiments.

DETAILED DESCRIPTION

An electronic device may be provided with a flexible display and other user interface components. The user interface components may include buttons, switches, microphones, actuators such as solenoids, motors, and piezoelectric actuators, connector ports, touch screens, proximity sensors and other components for accepting input from, or transmitting information to, a user of the electronic device.

Flexible displays may be formed from flexible layers such as a flexible display layer (e.g., a flexible organic light-emitting diode array), a flexible touch-sensitive layer (e.g., a sheet of polymer with an array of transparent capacitor electrodes for a capacitive touch sensor), a flexible substrate layer, etc. These flexible layers may, if desired, be covered by a flexible or rigid cover layer (sometimes referred to as a cover glass) or may be supported by a support structure (e.g., a rigid support structure on the underside of the flexible layers). In electronic devices with flexible displays that are covered by rigid cover layers, the cover layers may be provided with openings that provide access to the flexible layers of the display in the vicinity of a user interface device. For example, a cover glass layer may have an opening that allows a button member to move relative to the cover glass layer. As another example, a cover glass layer may have one or more speaker openings through which sound may pass.

To maximize the area of the portion of the flexible display that is available for displaying visual information to the user, user interface components may be positioned behind, abutted against, or integrated into the flexible display. The deformable nature of the flexible display may allow a user to interact with the user interface components (input-output components) by moving the display into contact with the user interface components or by otherwise allowing the display to locally flex (e.g., to allow sound to pass through the flexible display or to allow barometric pressure measurements of the exterior environment to be made by an internal pressure sensor).

If desired, a portion of the flexible display may form a membrane structure for an electrical component. For example, a portion of the flexible display may form a speaker membrane for a speaker component. Components that may be provided with a membrane structure formed from a portion of a flexible display include speakers, microphones, laser microphones, pressure sensors, etc.

Figure 1:
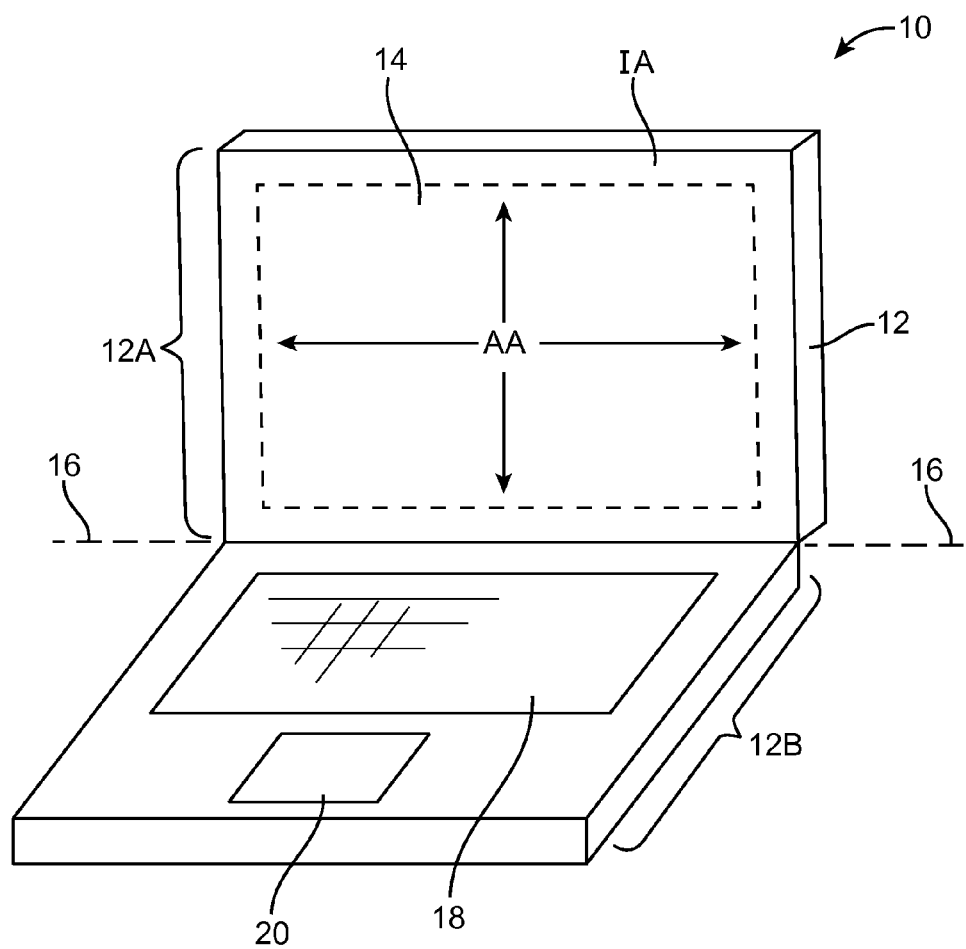
FIG. 1 is a diagram of an illustrative electronic device such as a portable computer having a display and one or more speaker structures in accordance with an embodiment of the present invention.

An illustrative electronic device of the type that may be provided with a flexible display is shown in FIG. 1. Electronic device 10 may be a computer such as a computer that is integrated into a display. For example, electronic device 10 may be a computer monitor, a laptop computer, a tablet computer, a somewhat smaller portable device such as a wristwatch device, pendant device, or other wearable or miniature device, a cellular telephone, a media player, a tablet computer, a gaming device, a speaker device, a navigation device, a computer monitor, a television, or other electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Device 10 may have a flexible display such as flexible display 14. Flexible display 14 may be formed from multiple layers of material. These layers may include a touch sensor layer such as a layer on which a pattern of indium tin oxide (ITO) electrodes or other suitable transparent electrodes have been deposited to form a capacitive touch sensor array. These layers may also include a display layer that contains an array of display pixels. The touch sensor layer and the display layer may be formed using flexible sheets of polymer (e.g., polyimide) or other substrates having thicknesses of 10 microns to 0.5 mm, having thicknesses of less than 0.2 mm, or having other suitable thicknesses (as examples).

The display pixel array may be an organic light-emitting diode (OLED) array, for example. Other types of flexible display pixel arrays may also be formed (e.g., electrowetting displays, electrophoretic displays, flexible liquid crystal displays, flexible electrochromic displays, etc.). The use of OLED technology to form flexible display 14 is sometimes described herein as an example. This is, however, merely illustrative. In general, any suitable type of flexible display technology may be used in forming display 14.

In addition to these functional display layers (i.e., the OLED array and the optional touch sensor array), display 14 may include one or more structural layers. For example, display 14 may be covered with a flexible or rigid cover layer and/or may be mounted on a support structure (e.g., a rigid support). If desired, layers of adhesive may be used to attach flexible display layers to each other and/or to mount flexible display layers to rigid and flexible structural layers.

In some embodiments, display 14 may have an active area such as active area AA and an inactive area such as area IA. In active display region AA, an array of image pixels may be used to present text and images to a user of device 10. In active region AA, display 14 may include touch sensitive components for input and interaction with a user of device 10. If desired, both central portion AA and peripheral portion IA may be provided with display pixels (i.e., all or substantially all of the entire front planar surface of upper housing portion 12A may be provided with display pixels).

Figure 2:
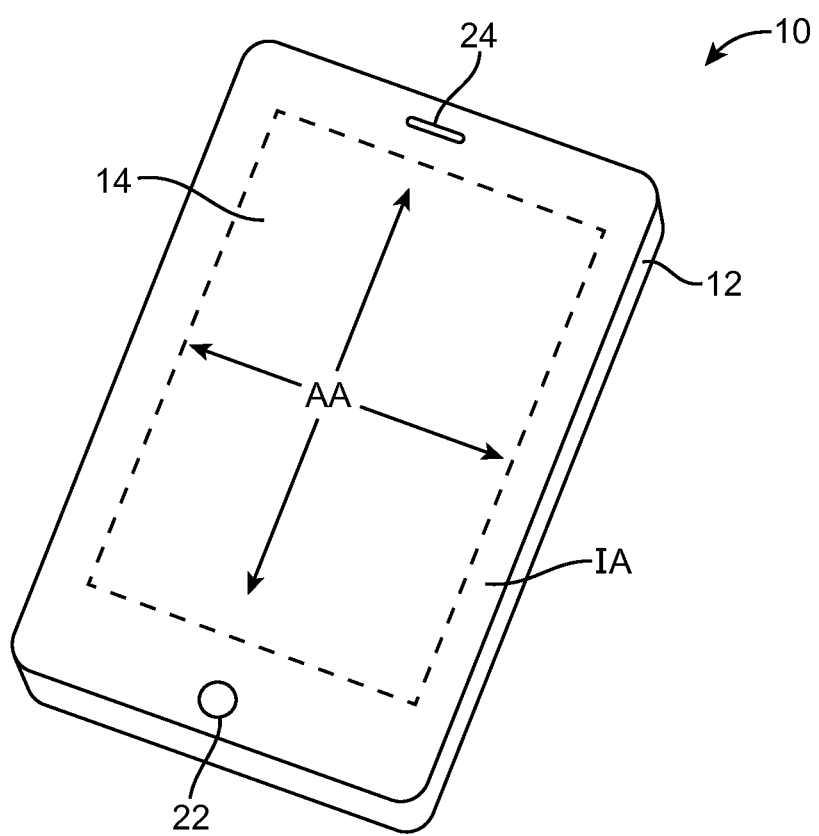
FIG. 2 is a diagram of an illustrative electronic device such as a cellular telephone or other handheld device having a display and one or more speaker structures in accordance with an embodiment of the present invention.

In the example of FIG. 2, device 10 has been implemented using a housing that is sufficiently small to fit within a user's hand (e.g., device 10 of FIG. 2 may be a handheld electronic device such as a cellular telephone). As show in FIG. 2, device 10 may include a display such as display 14 mounted on the front of housing 12. Display 14 may be substantially filled with active display pixels or may have an inactive portion such as inactive portion IA that surrounds an active portion such as active portion AA. Display 14 may have openings (e.g., openings in inactive region IA or active region AA of display 14) such as an opening to accommodate button 22 and an opening to accommodate speaker port 24.

Figure 3:
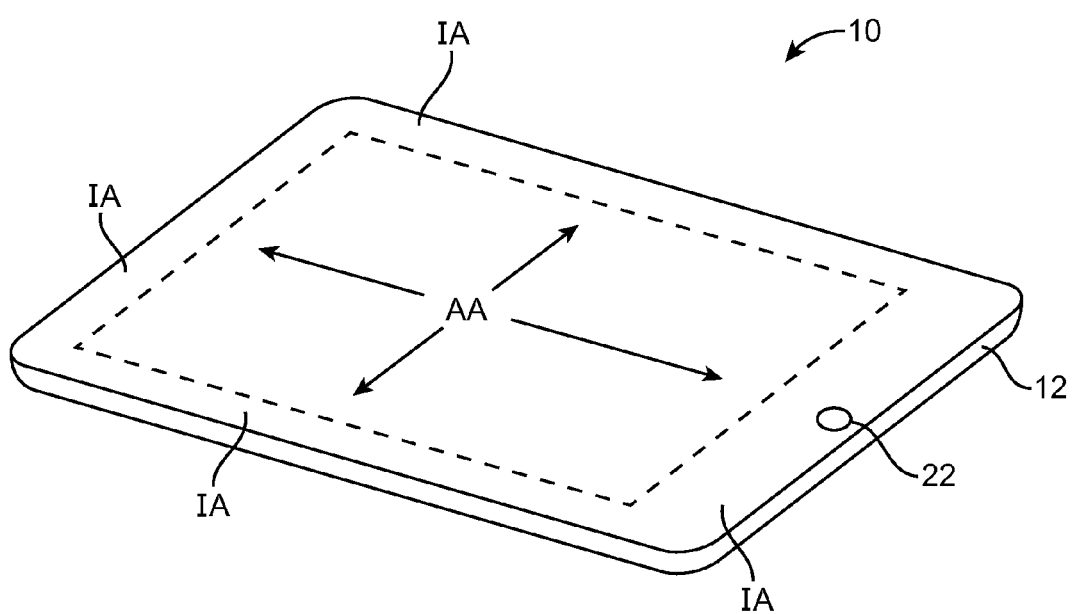
FIG. 3 is a diagram of an illustrative electronic device such as a tablet computer having a display and one or more speaker structures in accordance with an embodiment of the present invention.

FIG. 3 is a perspective view of electronic device 10 in a configuration in which electronic device 10 has been implemented in the form of a tablet computer. As shown in FIG. 3, display 14 may be mounted on the upper (front) surface of housing 12. An opening may be formed in display 14 to accommodate button 22 (e.g., an opening may be formed in inactive region IA surrounding active region AA).

Figure 4:
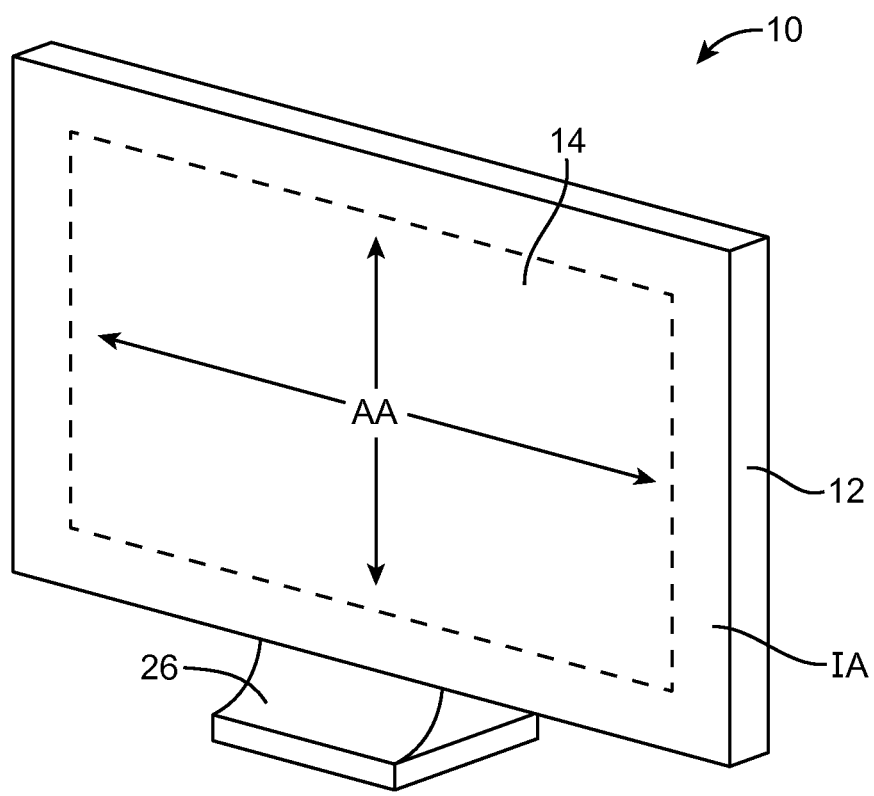
FIG. 4 is a diagram of an illustrative electronic device such as a computer monitor with a built-in computer having a display and one or more speaker structures in accordance with an embodiment of the present invention.

FIG. 4 is a perspective view of electronic device 10 in a configuration in which electronic device 10 has been implemented in the form of a television or in the form of a computer integrated into a computer monitor. As shown in FIG. 4, display 14 may be mounted on the front surface of housing 12. Stand 26 may be used to support housing 12. Display 14 may include an inactive region such as inactive region IA that surrounds active region AA.

Figure 5:
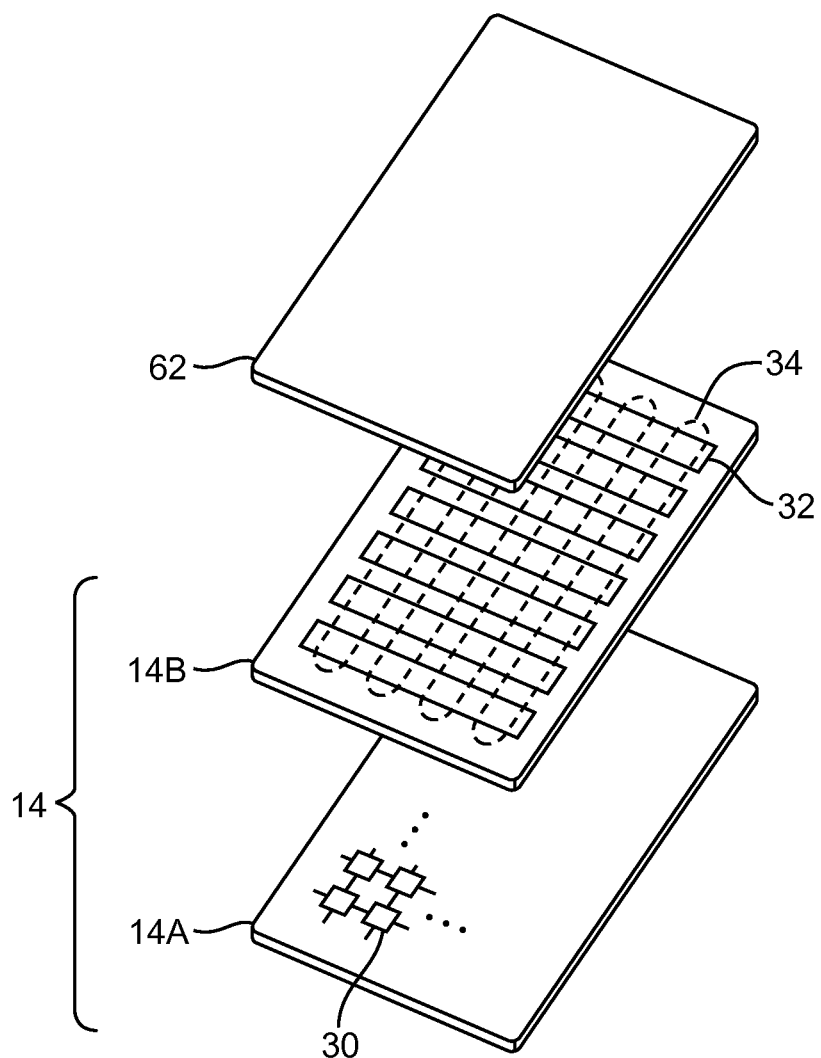
FIG. 5 is a diagram of an illustrative set of display layers that may be used to form a flexible display in accordance with an embodiment of the present invention.

An exploded perspective view of an illustrative display is shown in FIG. 5. As shown in FIG. 5, flexible display 14 may be formed by stacking multiple layers including flexible display layer 14A and touch-sensitive layer 14B. An optional cover layer such as cover layer 62 may be formed over flexible display 14. Cover layer 62 may be a layer of glass, plastic, or other protective display layer.

Flexible display 14 may also include other layers of material such as adhesive layers, optical films, sealant layers, or other suitable layers. Flexible display layer 14A may include image pixels formed from light-emitting diodes (LEDs), organic LEDs (OLEDs), plasma cells, electrowetting display elements, electrophoretic display elements, liquid crystal display (LCD) components, or other suitable image pixel structures compatible with flexible displays.

Touch-sensitive layer 14B may incorporate capacitive touch electrodes such as horizontal transparent electrodes 32 and vertical transparent electrodes 34. Touch-sensitive layer 14B may, in general, be configured to detect the location of one or more touches or near touches on touch-sensitive layer 14B based on capacitive, resistive, optical, acoustic, inductive, or mechanical measurements, or any phenomena that can be measured with respect to the occurrences of the one or more touches or near touches in proximity to touch sensitive layer 14B.

Flexible display 14 may be formed from display pixel array layer 14A and optional touch sensor layer 14B. In the example of FIG. 5, touch-sensitive layer 14B is interposed between cover layer 62 and flexible display layer 14A. This arrangement is merely illustrative. If desired, flexible display layer 14A may be interposed between cover layer 62 and touch-sensitive layer 14B (e.g., flexible display layer 14A may be arranged on top of touch-sensitive layer 14B). If desired, touch-sensitive layer 14B and flexible display layer 14A may be integrated as a single layer. For example, capacitive touch electrodes such as electrodes 32 and 34 and display pixels such as display pixels 30 may be formed on a common substrate, if desired.

Figure 6:
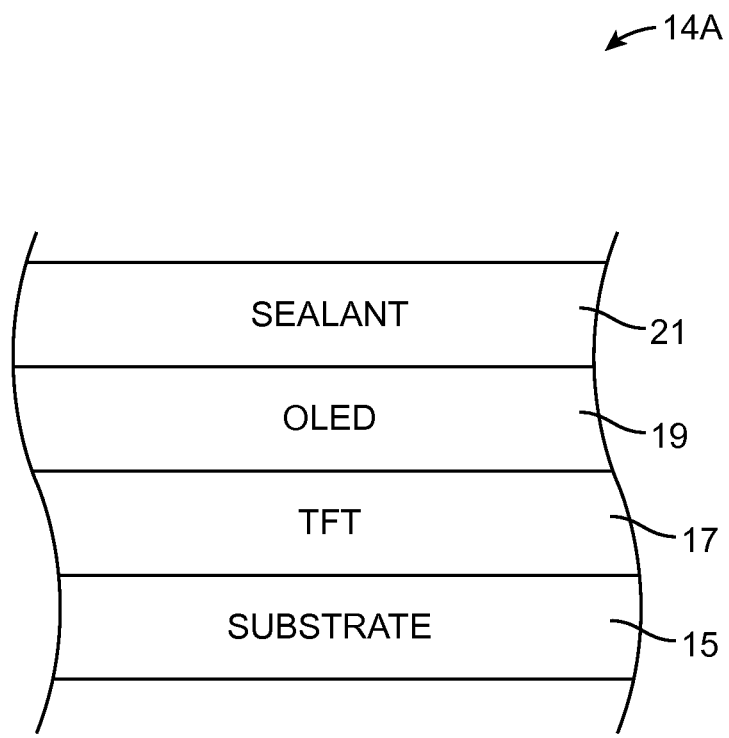
FIG. 6 is a diagram of an illustrative set of layers that may be used to form an organic light-emitting diode display in accordance with an embodiment of the present invention.

FIG. 6 is a cross-sectional side view of a portion of flexible display layer 14A. As shown in FIG. 6, flexible display layer 14A may contain multiple sublayers. For example, display layer 14A may include a substrate layer such as substrate layer 15. Substrate layer 15 may be formed from a flexible or rigid dielectric such as glass, ceramic, or plastic. As an example, substrate layer 15 may be formed from one or more flexible sheets of polymer (e.g., polyimide). Substrate layer 15 may have a thickness of 10 microns to 0.5 mm, may have a thickness of less than 0.2 mm, or may have other suitable thickness (as examples).

A thin-film transistor (TFT) layer such as TFT layer 17 may include a layer of thin-film transistor structures (e.g., polysilicon transistors and/or amorphous silicon transistors) formed on substrate layer 15.

An organic emissive layer such as OLED layer 19 may be formed over TFT layer 17. OLED layer 19 may include a light-emitting material such as an array of organic light-emitting diode structures that are used to form display pixels such as display pixels 30 of FIG. 5.

A sealant layer such as sealant layer 21 may be formed over OLED layer 19 to protect the structures of OLED layer 19 and TFT layer 17. Sealant layer 21 may be formed from one or more layers of polymer (e.g., one or more layers of polymer that are deposited onto OLED layer 19), metal foil (e.g., a layer of metal foil that is laminated, sputtered, evaporated, or otherwise applied onto OLED layer 19), or other suitable coating or conformal covering.

Figure 7:
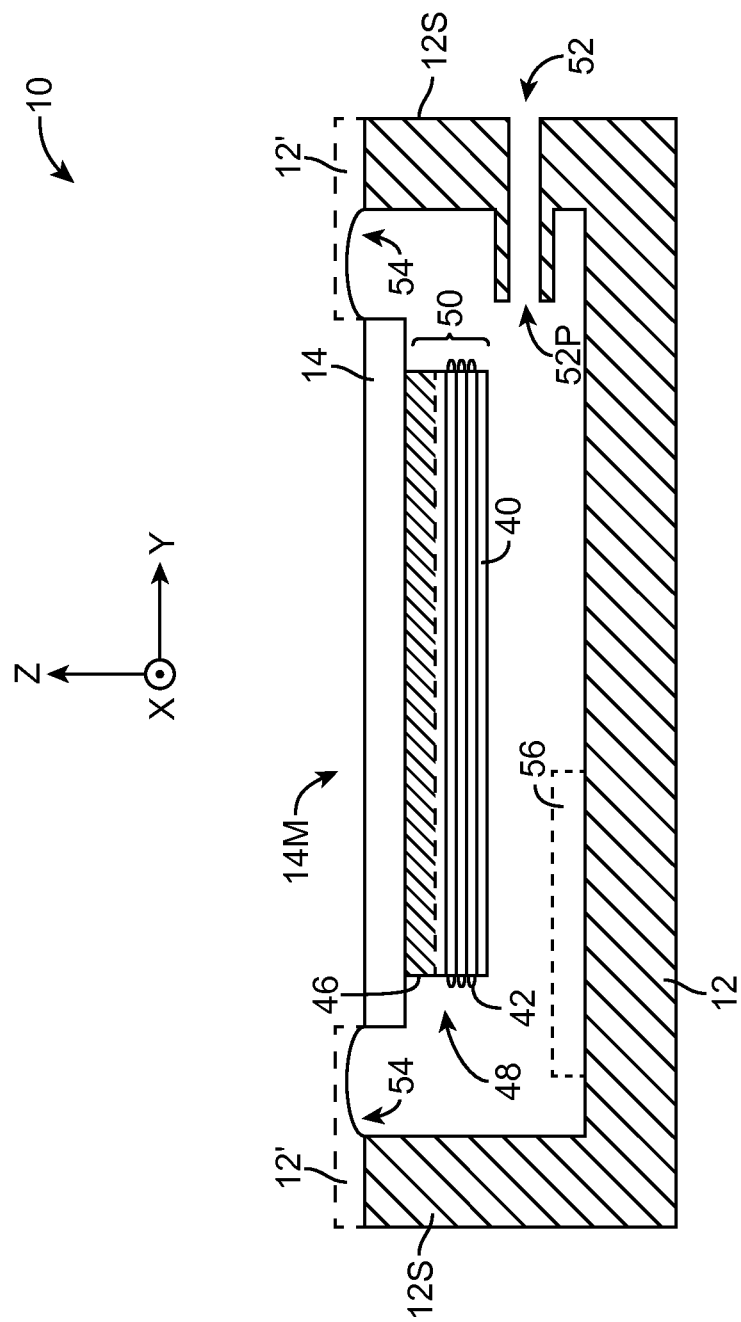
FIG. 7 is a cross-sectional side view of a portion of an illustrative electronic device in which a flexible display forms part of a speaker structure in accordance with an embodiment of the present invention.

Electronic device 10 may be provided with one or more speaker structures for providing sound to a user of electronic device 10. FIG. 7 is a cross-sectional side view of a portion of electronic device 10 in the vicinity of a speaker structure such as speaker structure 48. Sound produced by speaker structure 48 may be transmitted through flexible display 14 to the exterior of device 10. Flexible display 14 may be used as a speaker membrane structure for speaker 48. Portions such as portion 14M that serve as a speaker membrane for speaker 48 may be located in an active or inactive portion of display 14. Arrangements in which speaker membrane 14M forms an active display area may allow the size of the active region of flexible display 14 to be increased relative to its inactive region.

As shown in FIG. 7, speaker structure 48 may be driven by a transducer such as transducer 50. Transducer 50 may be configured to receive electrical audio signal input from circuitry in device 10 and to convert the electrical signal into sound. In the example of FIG. 7, transducer 50 is formed from a magnet such as magnet 40 surrounded by coils such as coils 42. Magnet 40 may be a permanent magnet formed from ferrite material, ceramic material, iron alloy material, rare earth material, other suitable material, or a combination of these materials. Coils 42 may be formed from copper, aluminum, silver, other suitable materials, etc. If desired, there may be one or more sets of coils surrounding magnet 40.

When current passes through coils 42, a magnetic field is produced. This allows coils 42 to act as a variable electromagnet with a magnetic field that interacts with the constant magnetic field produced by permanent magnet 40. For example, the negative pole of the electromagnet may be repelled by the negative pole of permanent magnet 40. The magnetic force created by this repulsion will force magnet 40 away from coils 42. When the current flowing through coils 42 changes direction, the polarity of the variable electromagnet reverses. Magnet 40 may be pushed back and forth rapidly (along the z-axis) as the current in coils 42 alternates directions.

Portions of flexible display 14 such as portion 14M may form a speaker membrane for speaker 48. As magnet 40 moves back and forth along the z-axis, attached speaker membrane 14M will in turn vibrate the air in front of speaker membrane 14M, creating sound waves.

In some arrangements, an optional support structure such as support structure 46 (sometimes referred to as a stiffening structure or stiffener) may be interposed between transducer 50 and speaker membrane 14M. Support structure 46 may be used to stiffen speaker membrane portion 14M of display 14. Support structure 46 may be formed from a metal plate, from specialized composite structures (e.g., a layer of foam interposed between layers of stiffener, etc.), from other support materials or stiffening structures, or from a combination of these materials. Using a support structure such as support structure 46 may allow speaker membrane 14M to respond more accurately to the movement of magnet 40. In arrangements where optional support structure 46 is not used, magnet 40 may be configured to stiffen portion 14M of display 14 that serves as a speaker membrane structure.

There may be one or more speaker structures 48 in device 10. Some or all of speaker structures 48 in device 10 may have speaker membranes that are formed from flexible display 14. If desired, some, all, or substantially all of flexible display 14 may be used as a speaker membrane for one speaker, for two speakers, for three speakers, or for more than three speakers.

A suspension structure such as suspension structure 54 may be used to attach portions of flexible display 14 to a rigid support structure such as housing 12. Suspension structure 54 may prevent speaker membrane 14M from moving laterally along the x-axis and/or the y-axis, but may allow free motion of speaker membrane 14M along the z-axis as speaker 48 produces sound. Suspension structure 54 may be formed from an elastomeric material, foam material, resin coated material, other suitable materials, or a combination of these materials. As shown in the example of FIG. 7, suspension structure 54 may form a pliant interface between speaker membrane 14M and housing sidewalls 12S. This is merely illustrative. If desired, suspension structure 54 may form a pliant interface between speaker membrane 14M and any suitable surrounding housing structure or any suitable rigid support structure.

If desired, other suspension structures may be incorporated into speaker structure 48. For example, there may be one or more suspension structures attached to magnet 40. This type of suspension structure may provide a restoring force that returns magnet 40 to an equilibrium position after being displaced by magnetic forces.

The desired range of frequencies produced by speaker 48 may depend on several factors. For example, the desired range of frequencies produced by speaker 48 may depend on the type of electronic device in which speaker 48 is implemented, may depend on the location of speaker 48 in device 10, may depend on the other speaker structures that are being used in combination with speaker structure 48, etc. Design choices may be made to obtain a desired frequency response from speaker 48. For example, materials used in forming speaker 48 may be selected based on the desired frequency response.

The type of enclosure that surrounds speaker 48 may also be selected based on the desired frequency response. For example, the enclosure that surrounds the speaker may be ported. As shown in FIG. 7, housing 12 may optionally be provided with an opening or port such as acoustic port 52 (sometimes referred to as a funnel, horn, vent, hole, etc.). Port 52 may be used to equalize the pressure between the inside of housing 12 and the outside of housing 12. This may in turn augment the sound waves produced by speaker 48. A ported enclosure such as the ported enclosure shown in the example of FIG. 7 may increase the magnitude of low-frequency sound waves produced by speaker 48 (e.g., a speaker with a ported enclosure may have a higher bass output than a speaker with a sealed enclosure).

As shown in FIG. 7, port 52 may have a portion such as portion 52P that protrudes into the enclosure. The size and shape of protruding portion 52P may be customized to obtain a desired frequency response. For example, protruding portion 52P of port 52 may have a "horn" shape, in which the diameter of opening 52 varies along the length of portion 52P. Protruding portion 52P may have a curved shape, if desired. In general, protruding portion 52P may have any suitable shape, and opening 52 may have any suitable size. The characteristics of port 52 will depend on the desired frequency response of speaker 48, the structure of device 10, etc., and may be modified accordingly. The example shown in FIG. 7 is merely illustrative.

If desired, speaker 48 may be provided with a sealed enclosure that does not have a port. The example of FIG. 7 in which housing 12 is provided with port 52 is merely illustrative. The type of enclosure into which speaker 48 is implemented (e.g., a sealed enclosure, a ported enclosure, etc.) will depend on the desired frequency response of speaker 48, the structure of device 10, etc., and may be modified accordingly.

Electronic device 10 may have internal components or structures such as internal component 56. Internal components such as internal component 56 may optionally be used to tune the resonant frequency of speaker 48. Internal component 56 may be a battery or other internal structure. If desired, optional component 56 may be omitted or may otherwise not be used to tune the resonant frequency of speaker 48.

If desired, housing 12 may have one or more raised edges such as optional raised portion 12'. Raised portion 12' may have an upper surface that lies above the upper surface of display 14 (e.g., the upper surface of raised portion 12' may protrude above the upper surface of flexible display 14 in vertical dimension z). Optional raised housing 12' may allow a user to hold device 10 in hand without disrupting the speaker functionality of display 14. Raised portion 12' of housing 12 may surround the entire periphery of display 14, or may be located on one side of display 14, on two sides of display 14, on three sides of display 14, or on all four sides of display 14. Raised portion 12' may be formed as an integral part of housing 12 or may be formed as a separate structure in contact with housing 12.

Figure 8:
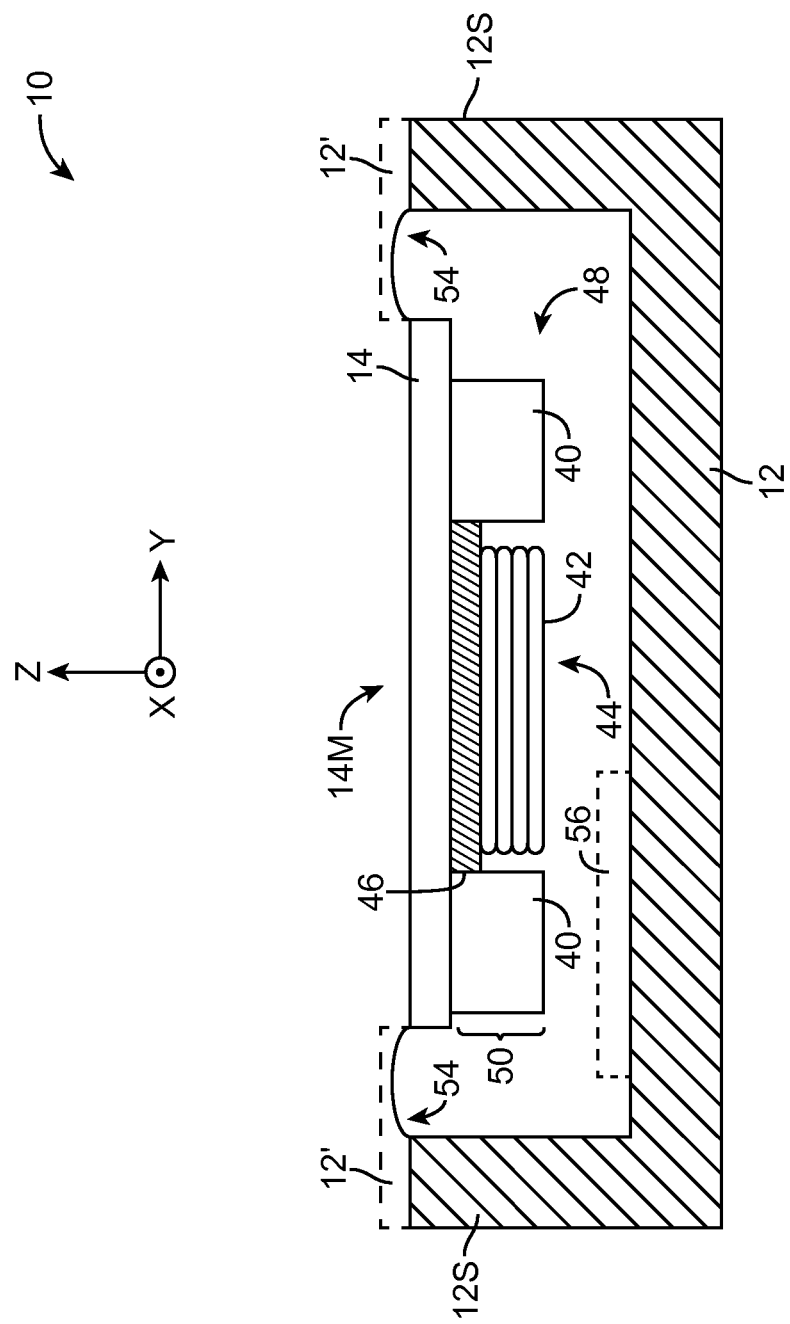
FIG. 8 is a cross-sectional side view of a portion of an illustrative electronic device in which a flexible display forms part of a speaker structure in accordance with an embodiment of the present invention.

FIG. 8 is a cross-sectional side view of a portion of electronic device 10 in the vicinity of another possible embodiment of speaker structure 48. As shown in FIG. 8, speaker structure 48 may be driven by a transducer such as transducer 50. In the example of FIG. 8, transducer 50 may be formed from one or more central sets of coils 42 surrounded by a magnet such as magnet 40. In some arrangements, inner portion 44 of coils 42 may also contain a magnet structure (e.g., coils 42 may surround a magnet structure). Magnet structures that are formed within inner portion 44 of coils 42 may be formed as an integral part of outer magnet 40 (e.g., may be joined above and/or below coils 42) or may be a separate magnet structure. If desired, inner portion 44 of coils 42 may be free of magnet structures.

As with the transducer of FIG. 7, transducer 50 of FIG. 8 may be configured to receive electrical audio signal input from circuitry in device 10 and to convert the electrical signal into sound. As current passes through coils 42, a magnetic field is produced. The magnetic field produced by coils 42 interacts with the constant magnetic field produced by permanent magnet 40. The interaction of the electromagnet with the constant magnetic field will create a magnetic force between coils 42 and magnet 40 (e.g., an attractive or repulsive force). When the current flowing through coils 42 changes direction, the polarity of the variable electromagnet (and thus the direction of magnetic force) is reversed. Coils 42 may be pushed back and forth (along the z-axis) by the varying magnetic force as the current in coils 42 alternates directions.

As coils 42 move back and forth, attached speaker membrane 14M will in turn vibrate the air in front of speaker membrane 14M, creating sound waves. Support structure 46 may be used to stiffen speaker membrane 14M so that membrane portion 14M of flexible display 14 responds accurately to the movement of transducer 50.

In the example of FIG. 8, speaker 48 may be provided with a sealed enclosure that does not have a port. This is merely illustrative. Any suitable type of enclosure (e.g., a sealed enclosure, a ported enclosure, etc.) may be used. The type of enclosure into which speaker 48 is implemented will depend on the desired frequency response of speaker 48, the structure of device 10, etc., and may be modified accordingly.

Figure 9:
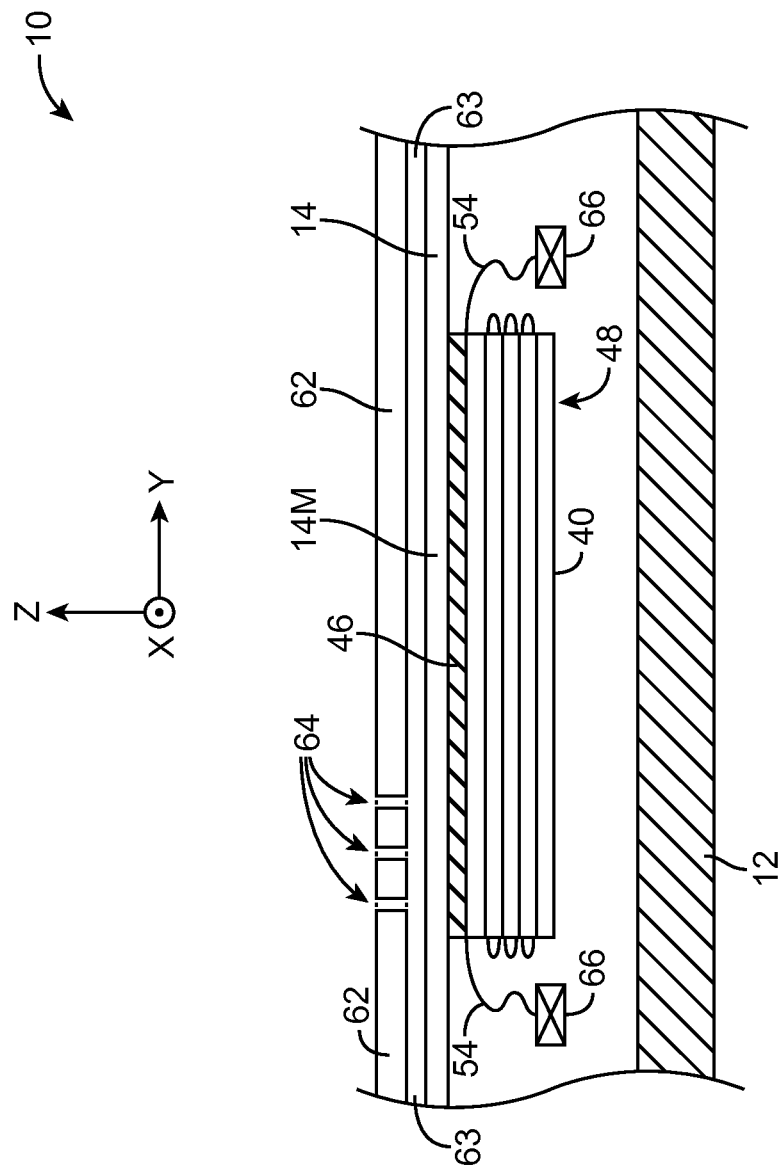
FIG. 9 is a cross-sectional side view of a portion of an illustrative electronic device in which a flexible display forms part of a speaker structure in accordance with an embodiment of the present invention.

FIG. 9 is a cross-sectional side view of a portion of device 10 in the vicinity of another possible embodiment of speaker structure 48. In the example of FIG. 9, speaker 48 is supported by a rigid structure within device 10 such as rigid structure 66. Rigid structure 66 may be formed from housing structures or internal components, or may be a dedicated structure used to form a frame (sometimes referred to as a chassis or "basket") or other rigid support structure for speaker 48. Suspension structure 54 may be used to form a pliant interface between speaker 48 and rigid structure 66. As with the suspension structure of FIGS. 7 and 8 (in which suspension structure 54 is attached to housing sidewalls 12S), suspension structure 54 of FIG. 9 may prevent speaker membrane portions 14M of display 14 from moving laterally along the x-axis and/or the y-axis, but may allow free motion of speaker membrane 14M along the z-axis as speaker 48 produces sound. Suspension structure 54 may be attached to any suitable portion of speaker 48 (e.g., support structure 46, magnet 40, speaker membrane portion 14M, etc.)

The type of arrangement shown in FIG. 9 may be beneficial for configurations in which speaker 48 is not in the vicinity of housing sidewalls 12S or in other configurations in which speaker 48 is not attached to housing 12. For example, speaker 48 may be located in the central portion of a large display. In this type of configuration, a rigid structure such as rigid structure 66 of FIG. 9 may be used to support speaker 48, if desired.

There may be one or more speakers 48 in device 10. Multiple speakers 48 may be attached to a common rigid structure 66 or each speaker 48 may be attached to a separate rigid structure 66.

If desired, a cover layer such as optional cover layer 62 may be formed over flexible display 14. Cover layer 62 may be formed from glass, plastic, or other suitable material. Cover layer 62 may allow a user to hold device 10 in hand without disrupting the speaker functionality of display 14. Cover layer 62 may also serve to protect display 14 and other parts of device 10 while still allowing speaker membrane 14M to move freely along the z-axis as speaker 48 produces sound. Cover layer 62 may be in contact with display 14 or there may be a gap 63 interposed between cover layer 62 and display 14. Gap 63 may be filled with air or may include a layer of material such as a layer of sealant (as an example).

One or more holes such as holes 64 (sometimes referred to as openings or speaker openings) may be formed in cover layer 62 so that sound may pass from speaker 48 to the exterior of device 10.

Figure 10:
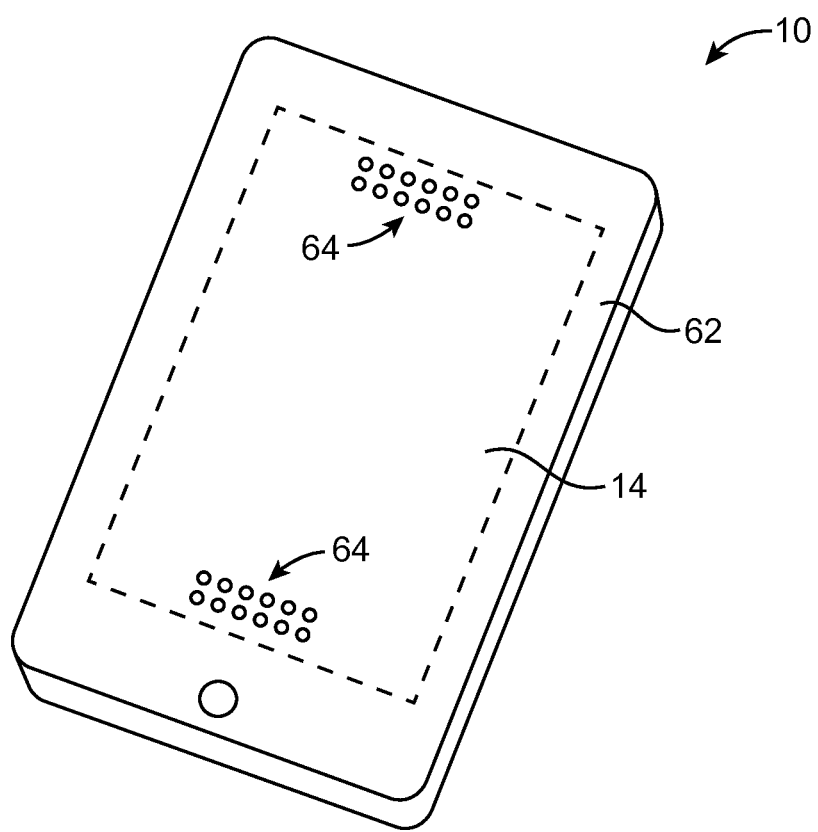
FIG. 10 is a perspective view of an illustrative electronic device of the type shown in FIG. 9 having a cover layer with speaker openings in accordance with an embodiment of the present invention.

A perspective view of device 10 showing how holes 64 may be formed in cover layer 62 is shown in FIG. 10. As shown in FIG. 10, holes 64 may be formed in a "speaker grill" fashion in which an array of openings is formed in front of one or more speakers. Holes 64 may be formed in cover layer 62 in any suitable location. For example, holes 64 may be formed in localized areas of cover layer 62 that overlap a speaker structure, or holes 64 may be formed in a uniform array that covers some, all, or substantially all of the front surface of display 14. Holes 64 may have any suitable size. For example, holes 64 may have a diameter between 0.25 mm and 0.5 mm, between 0.5 mm and 1 mm, between 1 mm and 1.5 mm, more than 1.5 mm, less than 1.5 mm, etc. The size, shape, and number of openings 64 formed in cover layer 62 may depend on the type and number of speakers 48 in device 10.

Figure 11:
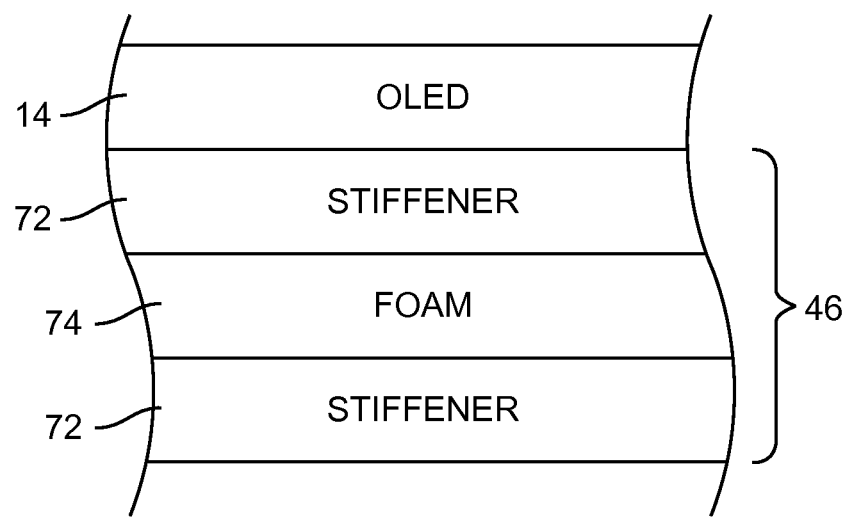
FIG. 11 is a cross-sectional side view of a portion of an illustrative electronic device in which a flexible display is stiffened with a support structure in accordance with an embodiment of the present invention.

FIG. 11 is a cross-sectional side view of device 10 in the vicinity of support structure 46. Support structure 46 may be used to stiffen portions of flexible display 14. As discussed in connection with FIG. 7, stiffening structure 46 may be formed from a metal plate, from fiber-based composite materials, from laminated layers of one or more materials, or from other suitable materials. As shown in the example of FIG. 11, stiffening structure 46 may be formed from a layer of foam 74 interposed between first and second stiffening sheets 72. Sheets 72 may be formed from polymer, metal, glass, ceramic, fiber-based composites, or other suitable materials. This type of structure may provide a stiff and lightweight support structure for display 14. If desired, support structure 46 may be used to stiffen speaker membrane portions 14M of display 14, may be used to stiffen other portions of display 14, or may be used to stiffen all or substantially all of display 14.

Support structure 46 may be shaped in any desired fashion. For example, support structure 46 may be curved, may be planar, or may have a combination of curved and planar portions.

Figure 12:
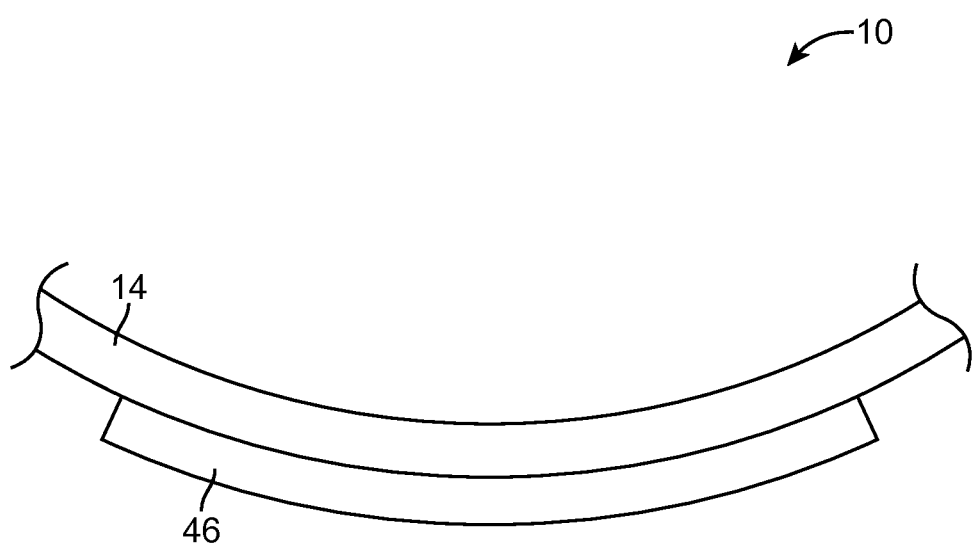
FIG. 12 is a cross-sectional side view of a portion of an illustrative electronic device having a curved flexible display with a curved support structure in accordance with an embodiment of the present invention.

FIG. 12 is a cross-sectional side view of device 10 in the vicinity of curved support structure 46. As shown in FIG. 12, flexible display 14 may conform to the shape of stiffening structure 46. In the example of FIG. 12 stiffening structure 46 has a curved shape so that flexible display 14 is concave. This is, however, merely illustrative. In general, stiffening structure 46 and the attached portion of display 14 may have any suitable shape. For example, stiffening structure 46 may have a curved shape so that flexible display 14 is convex. The example of FIG. 12 in which display 14 has a concave shape may be suitable for configurations in which display 14 forms a speaker membrane for speaker 48. A concave shaped speaker membrane may improve the quality of sound produced by speaker 48. Speakers with convex membranes may also be used.

Figure 13:
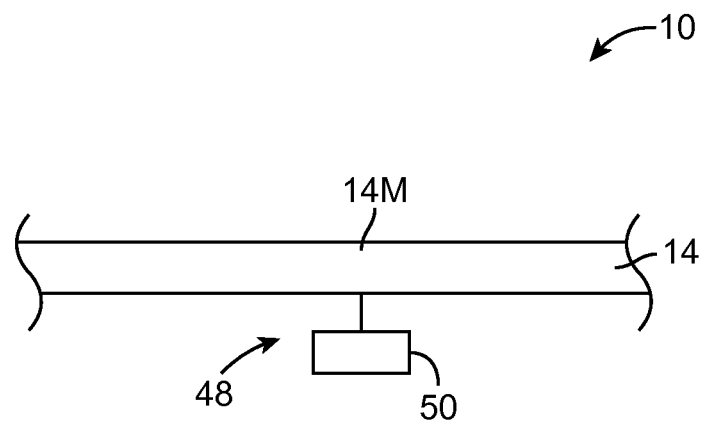
FIG. 13 is a cross-sectional side view of a portion of an illustrative electronic device in which a flexible display forms part of a single speaker structure in accordance with an embodiment of the present invention.

FIG. 13 is a cross-sectional side view of device 10 in the vicinity of a single speaker structure. As shown in FIG. 13, portion 14M of flexible display 14 may form a speaker membrane for speaker structure 48. Transducer 50 for speaker 48 may be any suitable type of transducer (e.g., one or more sets of coils surrounded by a magnet, one or more sets of coils surrounding a magnet, a piezoelectric transducer, a microphone transducer, a sensor, an actuator, etc.). Speaker 48 may be the only speaker in device 10 or may be one of a plurality of speakers in device 10. Display-based speaker structure 48 may be used in conjunction with speaker structures that are not display-based. For example, there may be other speakers in device 10 which do not use display 14 as a speaker membrane. Speaker structure 48 of FIG. 13 may use all or substantially all of display 14 as a speaker membrane (e.g., the entire front face of device 10 may be occupied by a speaker), or may use only a portion of display 14 as a speaker membrane.

Figure 14:
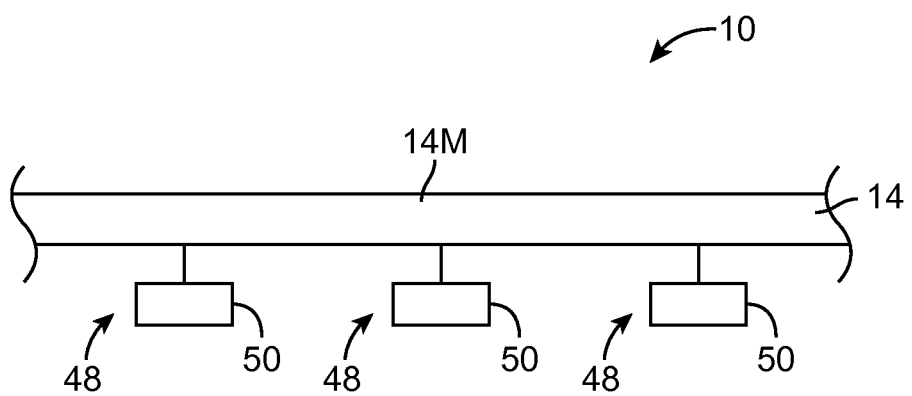
FIG. 14 is a cross-sectional side view of a portion of an illustrative electronic device in which a flexible display forms part of an array of speaker structures in accordance with an embodiment of the present invention.

In the example of FIG. 14, an array of transducers 50 may be used to form a plurality of display-based speakers 48. Display-based speaker structures 48 may be used in conjunction with speaker structures that are not display-based. Each display-based speaker 48 may have an associated transducer 50. Each associated transducer 50 may be any suitable type of transducer (e.g., one or more sets of coils surrounded by a magnet, one or more sets of coils surrounding a magnet, a piezoelectric transducer, a microphone transducer, a sensor, an actuator, etc.). The type of transducer 50 used may be different for each speaker (e.g., the array of speakers 48 in FIG. 14 may include different types of transducers, if desired). Providing speakers 48 with different types of transducers, different structures, and different characteristics may give device 10 the ability to produce sound with a wider range of frequencies.

Figure 15:
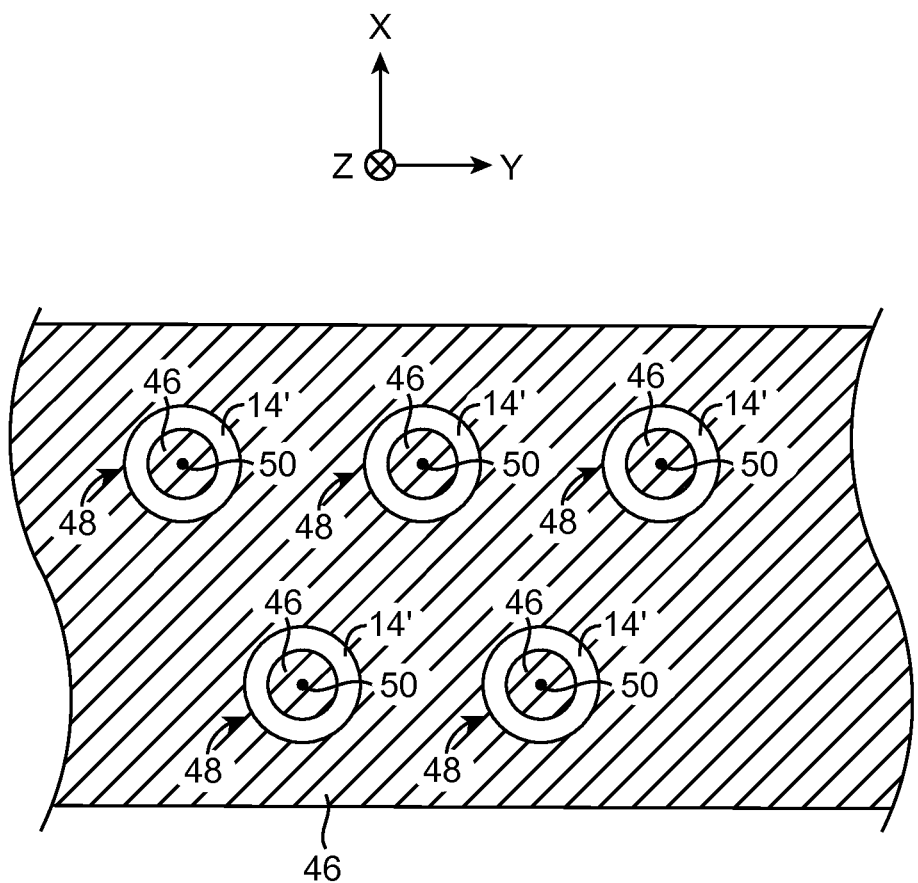
FIG. 15 is a bottom view of an illustrative electronic device of the type shown in FIG. 14 having a flexible display that forms part of an array of speaker structures in accordance with an embodiment of the present invention.

FIG. 15 is a bottom view of a portion of device 10 showing how an array of display-based speakers such as the array shown in FIG. 14 may be implemented in device 10. In the example of FIG. 15, support structure 46 is formed on the underside of display 14. Support structure 46 may be used to stiffen speaker membrane portions 14M of display 14 (e.g., support structure 46 may be interposed between transducer 50 and display 14). Support structure 46 may also be used to stiffen portions of display 14 between adjacent speakers 48.

Each speaker 48 may be surrounded by a ring 14' of flexible display 14 that is not stiffened by support structure 46. Flexible ring-shaped portions 14' of flexible display 14 may provide a barrier structure around each speaker 48 that prevents interference between adjacent speakers 48. For example, as speaker membrane 14M vibrates, ring 14' (which is surrounded by support structure 46) may absorb vibrations moving laterally in display 14 (e.g., in directions along the x-axis and/or y-axis). This may allow adjacent speakers 48 to operate independently without being disrupted by the vibrations of a neighboring speaker.

If desired, speakers 48 may include a variety of speaker types. Examples of speaker types that may be used for speakers 48 include subwoofers, woofers, mid-range speakers, tweeters, supertweeters, etc. If desired, different channels of audio input may be routed to each speaker. For example, speakers 48 may include a center channel speaker, a left channel speaker, a right channel speaker, a surround channel speaker, etc. Any suitable characteristic of speakers 48 (e.g., size, type, location, input channel, etc.) may be modified to achieve a desired frequency response and/or to accommodate the structure of device 10.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   a flexible display;
   a speaker structure having a speaker membrane, wherein the speaker membrane is formed from a portion of the flexible display; and
   a stiffening structure configured to stiffen the portion of the flexible display that forms the speaker membrane, wherein the stiffening structure comprises a layer of foam and first and second stiffening sheets that are attached to opposing first and second sides of the layer of foam.

2. The electronic device defined in claim 1 wherein the flexible display comprises an active portion configured to display images and wherein the speaker membrane is formed from the active portion of the flexible display.

3. The electronic device defined in claim 1, further comprising:
   a rigid structure; and
   a suspension structure configured to attach portions of the speaker structure to the rigid structure.

4. The electronic device defined in claim 3, further comprising:
   an electronic device housing in which the flexible display is mounted, wherein the rigid structure is formed at least partly from the electronic device housing.

5. The electronic device defined in claim 1, further comprising:
   a cover layer formed over the flexible display, wherein the cover layer comprises at least one opening formed over the speaker membrane.

6. The electronic device defined in claim 1 further comprising an electronic device housing in which the flexible display is mounted, wherein the electronic device housing has at least one acoustic port.

7. The electronic device defined in claim 1 wherein the flexible display comprises an organic light-emitting diode display having a substrate formed from a flexible sheet of polymer.

8. An electronic device, comprising:
   a flexible display; and
   a plurality of speaker structures, wherein portions of the flexible display form speaker membranes for the plurality of speaker structures, wherein the flexible display comprises:
      a set of stiffened regions, wherein each of the stiffened regions in the set of stiffened regions forms part of a respective one of the speaker structures;
      flexible regions, wherein each of the flexible regions surrounds a respective one of the stiffened regions in the set of stiffened regions; and
      a surrounding stiffened region, wherein each of the flexible regions is surrounded by portions of the surrounding stiffened region.

9. The electronic device defined in claim 8, further comprising:
   a plurality of stiffening structures configured to stiffen the portions of the flexible display that form the speaker membranes.

10. The electronic device defined in claim 8 wherein the speaker structures comprise a left channel speaker and a right channel speaker.

11. The electronic device defined in claim 8, further comprising:
    transducers configured to drive the speaker structures, wherein each transducer comprises coils and a magnet.

12. The electronic device defined in claim 8 further comprising piezoelectric transducers configured to drive the speaker structures.

13. The electronic device defined in claim 8 wherein the flexible display comprises an organic light-emitting diode display having a substrate formed from a flexible sheet of polymer.

14. A portable electronic device, comprising:
- a housing;
- a flexible organic light-emitting diode display mounted in the housing, wherein the flexible organic light-emitting diode display has a substrate formed from a flexible sheet of polymer;
- at least one speaker having a transducer and a speaker membrane formed from a portion of the flexible sheet of polymer, wherein the transducer is mounted to the flexible sheet of polymer; and
- a stiffening structure interposed between and in contact with the flexible sheet of polymer and the transducer.

15. The portable electronic device defined in claim 14 wherein the stiffening structure comprises a composite material.

16. The portable electronic device defined in claim 14 wherein the speaker membrane has a concave shape.

17. The portable electronic device defined in claim 14 wherein the housing comprises a rectangular housing with four peripheral edges and wherein the flexible organic light-emitting diode display and the speaker membrane extend between the four peripheral edges.

18. The portable electronic device defined in claim 14 wherein the transducer comprises coils and a magnet.

19. The electronic device defined in claim 8 wherein the surrounding stiffened region completely surrounds each of the flexible regions to mechanically isolate each speaker structure from adjacent speaker structures.

20. The electronic device defined in claim 1 wherein the speaker structure comprises a transducer mounted to the flexible display.

21. The electronic device defined in claim 20 wherein the stiffening structure is interposed between and in contact with the transducer and the flexible display.

22. The electronic device defined in claim 21 wherein the transducer comprises coils and a magnet.

\* \* \* \* \*